(12) United States Patent
Sepulveda et al.

(10) Patent No.: US 10,570,868 B2
(45) Date of Patent: Feb. 25, 2020

(54) METHOD FOR OPERATING A POWER GENERATING DEVICE AND POWER GENERATING DEVICE

(71) Applicant: EKU Power Drives GmbH, Stuttgart (DE)

(72) Inventors: Leonardo Uriona Sepulveda, Stuttgart (DE); Martin Ball, Leonberg (DE)

(73) Assignee: EKU Power Drives GmbH, Stuttgart (DE)

(*) Notice: Subject to any disclaimer, the term of this patent is extended or adjusted under 35 U.S.C. 154(b) by 190 days.

(21) Appl. No.: 15/517,631

(22) PCT Filed: Oct. 6, 2015

(86) PCT No.: PCT/EP2015/072969
§ 371 (c)(1),
(2) Date: Apr. 7, 2017

(87) PCT Pub. No.: WO2016/055427
PCT Pub. Date: Apr. 14, 2016

(65) Prior Publication Data
US 2017/0328327 A1 Nov. 16, 2017

(30) Foreign Application Priority Data
Oct. 7, 2014 (DE) .................. 10 2014 220 311

(51) Int. Cl.
*F02N 11/08* (2006.01)
*F02D 41/04* (2006.01)
(Continued)

(52) U.S. Cl.
CPC .......... *F02N 11/0848* (2013.01); *F02D 29/06* (2013.01); *F02D 41/0027* (2013.01);
(Continued)

(58) Field of Classification Search
CPC ......... Y02E 60/12; Y02E 60/122; B60K 6/28; B60W 10/26; B60W 2510/244;
(Continued)

(56) References Cited

U.S. PATENT DOCUMENTS 6,664,651 B1 * 12/2003 Kotre .................... B60K 6/365
180/65.245
6,724,098 B2 4/2004 Ortega et al.
(Continued)

FOREIGN PATENT DOCUMENTS

DE 10148246 7/2002
DE 102004044960 5/2005
(Continued)

OTHER PUBLICATIONS

USPTO Non-Final Office Action dated Oct. 4, 2018, identified as Paper No. 20180913, pp. 1-19.
(Continued)

*Primary Examiner* — Erick R Solis
*Assistant Examiner* — Anthony L Bacon
(74) *Attorney, Agent, or Firm* — Bond Schoeneck & King, PLLC; George McGuire (57) ABSTRACT

The invention relates to a method for operating a power generating device having a combustion engine, in particular a gas motor or a gas turbine, and an energy accumulator. The combustion engine and the energy accumulator are electrically coupled together. The combustion engine can be operated in accordance with a first estimated value and in accordance with a second estimated value.

13 Claims, 7 Drawing Sheets

(51) Int. Cl.
*F02D 41/00* (2006.01)
*F02D 29/06* (2006.01)

(52) U.S. Cl.
CPC ........ *F02D 41/042* (2013.01); *F02N 11/0818* (2013.01); *F02N 11/0825* (2013.01); *F02N 11/0862* (2013.01); *F02D 2200/1004* (2013.01); *F02N 2200/046* (2013.01); *F02N 2200/061* (2013.01); *Y02T 10/48* (2013.01)

(58) Field of Classification Search
CPC .... F02D 29/06; F02D 41/0027; F02D 41/042; F02N 11/0818; F02N 11/0848; F02N 11/0862; F02N 2200/061; F02C 6/14
See application file for complete search history.

(56) References Cited

U.S. PATENT DOCUMENTS

| | | | |
|---|---|---|---|
| 2009/0107441 | A1 | 4/2009 | Husak et al. |
| 2009/0171554 | A1 | 7/2009 | Yaguchi |
| 2009/0204314 | A1* | 8/2009 | Aoki ...................... B60K 6/445 701/112 |
| 2012/0030270 | A1 | 2/2012 | Shokrollahi et al. |
| 2012/0056436 | A1 | 3/2012 | Russell et al. |
| 2014/0203760 | A1* | 7/2014 | Lammers ................ H02J 7/007 320/107 |
| 2014/0209289 | A1 | 7/2014 | Boot et al. |
| 2016/0046292 | A1* | 2/2016 | Miyashita ............... F02D 17/02 701/36 |

FOREIGN PATENT DOCUMENTS

| | | |
|---|---|---|
| DE | 102006037649 | 2/2008 |
| DE | 102010034444 | 2/2012 |
| JP | 2006050773 | 2/2006 |

OTHER PUBLICATIONS

International Serarch Report and Written Opinion Form PCT/ISA/220, International Application No. PCT/EP2015/072969, pp. 1-6, International Filing Date Oct. 6, 2015, dated Nov. 12, 2015.

* cited by examiner

METHOD FOR OPERATING A POWER GENERATING DEVICE AND POWER GENERATING DEVICE

CROSS-REFERENCE TO RELATED APPLICATIONS

The application is the U.S. National Stage filing under 35 U.S.C. 371 of international application number PCT/EP2015/072969 filed on Oct. 6, 2015, which in turn claims priority to German Application No. 102014220311.2, filed Oct. 7, 2014, the entire disclosure of each of which is incorporated herein by reference.

BACKGROUND OF THE INVENTION

The invention relates to a method for operating a power generating device and to a power generating device.

It is known that lean-burn gas motors having output powers in the range of above 400 kW have a slow-acting load alteration response in comparison with diesel motors in this power range. However, gas motors have a better emission behaviour in comparison with diesel motors. Furthermore, gas motors can be operated using waste gases or unrefined gases that result during the extraction of natural gas and/or petroleum.

It is also known that these lean-burn gas motors can be operated in a low partial-load range only for short periods of time. Furthermore, manufacturer instructions regarding the start-up and turn-off behaviour of the lean-burn gas motor have to be respected.

DE 10 2006 037 649 A1 discloses, for example, a gas motor having improved non-steady behaviour. Upstream of a turbine of an exhaust gas turbocharger, an additional fuel injection valve is arranged in the exhaust gas line.

U.S. Pat. No. 6,724,098 B2 discloses a generator system having a gas turbine, a generator driven by the gas turbine, and an energy accumulator, in which system the generator is operated as a motor in order to accelerate the gas turbine.

SUMMARY OF THE INVENTION

The object of the invention is therefore to provide a method for operating a power generating device and a power generating device, in order to improve operation of the power generating device by means of an combustion engine that has a slow-acting load alteration response.

The object addressed by the invention is achieved by a method and by a power generating device. Features that are important to the invention are also stated in the following description and in the drawings, it being possible for the features to be important to the invention both in isolation and in different combinations without this being explicitly indicated again.

An combustion engine and an energy accumulator are electrically coupled together. An current power of the combustion engine is determined. A first estimated value for energy that would be generated during a turn-off process of the combustion engine is determined on the basis of the current power of the combustion engine. A second estimated value for energy that the energy accumulator can reliably absorb is determined on the basis of a state of charge of the energy accumulator. The combustion engine is operated on the basis of the first estimated value and on the basis of the second estimated value. Advantageously, the energy source in the form of the combustion engine is thus not operated directly on the basis of the behaviour of the load. Rather, as a result of using the first estimated value and the second estimated value, taking the state of charge into account results in the operation of the combustion engine being only indirectly influenced. This results in considerable advantages both for the combustion engine and for the energy accumulator. Since the combustion engine is not operated directly on the basis of the current power of the load, but rather on the basis of the state of charge of the energy accumulator, the energy accumulator has a filter function with regard to the energy output of the power generating device. Changes or fluctuations in the power output of the combustion engine can be attenuated by means of the energy accumulator. Consequently, by preventing fluctuations in the energy output, wear of the combustion engine is significantly reduced, which has a positive influence on the maintenance costs for the combustion engine.

On account of the proposed method, the energy accumulator, in turn, is not in a permanent state of charge or discharge. A number of charging and discharging cycles is also kept to a minimum. This also reduces wear of the energy accumulator, which is a relatively expensive component of the power generating device. It can therefore also be said that the energy of the energy accumulator is the most expensive in comparison with the energy of the remaining system components. Thus, the energy accumulator advantageously acts not as an energy supply for the load, but rather as a buffer, since the load is preferably operated directly using the energy generated by the combustion engine. Accordingly, in the method according to the invention, the load draws the minimum energy required from the energy accumulator, and therefore the efficiency and service life of the energy accumulator, which are strongly influenced by the discharging and charging behaviour, are maximised.

In an advantageous embodiment, an increase in the current power is enabled if the first estimated value is no greater than the second estimated value. Thus, a state of the power generating device is identified in which the current power of combustion engine can be readily increased. By increasing the power of the load, the state of charge of the energy accumulator is initially reduced. As a result of the energy accumulator initially being discharged when the power of the load is increased, the energy in the energy accumulator can be used optimally. Accordingly, the running time of the combustion engine and therefore also the maintenance costs for the combustion engine are reduced.

In an advantageous embodiment, the current power of the combustion engine is reduced if the first estimated value is greater than the second estimated value.

In an advantageous development, the current power of the combustion engine is reduced if the current power is greater than a minimum continuous power of the combustion engine. This ensures that the combustion engine is not operated beyond its specification.

In an advantageous development, the current power of the combustion engine is reduced if the current power of the combustion engine is greater than the minimum continuous power of the combustion engine and if a state of charge of the energy accumulator increases. In particular, this also ensures that, as a result of a power sink suddenly being removed, all of the energy generated during a turn-off process of the combustion engine can be absorbed by the energy accumulator. As a result of the energy accumulator initially being charged when the power of the load is reduced, which increases the state of charge of the energy accumulator, and the current power of the combustion engine only then being reduced, all of the surplus energy generated by the combustion engine can be stored in the energy accumulator and an optimal use of energy can thus be achieved.

In an advantageous development, the current power of the combustion engine is reduced if the current power of the combustion engine is greater than a maximum charging capacity of the energy accumulator. This ensures that the energy accumulator is not operated beyond its specification or the service life thereof is not shortened.

In an advantageous embodiment, a turn-off process is started if the first estimated value is greater than the second estimated value.

In an advantageous embodiment, the turn-off process is started if the actual power of the combustion engine is lower than a minimum continuous power of the combustion engine. A turn-off time point for an combustion engine is determined on the basis of an actual power of the combustion engine and on the basis of a state of charge of an energy accumulator. A turn-off process of the combustion engine is started at the turn-off start time. Advantageously, this makes it possible for lean-burn gas motors that have a low-transient performance to also be usable for high-transient applications. Thus, a lean-burn gas motor can advantageously be operated using unrefined gas and, at the same time, by means of the method, high amounts of power can be provided for short periods of time in order to operate, for example, oil drilling rigs or the like.

In particular, it is ensured that, as a result of a power sink suddenly being removed, all of the energy generated during a turn-off process of the combustion engine can be absorbed by the energy accumulator. In particular, when using gas motors, a slow shutdown in the form of an overrun can ensure that maintenance intervals and outages of the gas motor can be reduced.

Furthermore, this method ensures that the accumulator has a high state of charge most of the time, which has a positive influence on the service life thereof when using, for example, a lithium ion battery. The increased charge of the accumulator which is thus possible results in an increased availability of the power generating device.

Advantageously, a power generating device that has a slow-acting energy source, such as a gas motor, and has an increased service life, together with reduced exhaust gas emissions and high-transient power output, can thus be provided. Advantageously, the efficiency of the entire system is improved since no braking apparatus, such as a braking resistor, is required to consume surplus energy generated by the gas motor.

In an advantageous embodiment, a first estimated value for energy that is generated during an overrun of the combustion engine is determined on the basis of the current power. A second estimated value for energy that the energy accumulator can reliably absorb during the overrun is determined on the basis of the state of charge. The turn-off process is started if the first estimated value is greater than the second estimated value. Advantageously, the energy accumulator is thus operated in an acceptable range. Furthermore, the combustion engine advantageously does not have to be provided with a braking apparatus in order to consume surplus energy generated by the combustion engine. Of course, a braking apparatus can also continue to be provided for an emergency shutdown or the like.

In an advantageous embodiment, the turn-off process is started if the current power of the combustion engine is greater than a maximum charging capacity of the energy accumulator. This prevents destruction of the power generating device, in particular in the converter region.

In an advantageous embodiment, the current power of the combustion engine is reduced as a function of an increasing state of charge of the energy accumulator. The current turn-off start time for the turn-off process of the combustion engine can advantageously be further delayed thereby, as a result of which the operating time of the combustion engine can advantageously be increased.

In an advantageous embodiment, the turn-off process is started if the current power of the combustion engine is lower than a minimum continuous power of the combustion engine. This means that the combustion engine can advantageously be operated in the range of the minimum continuous power or above the minimum continuous power until the turn-off time point has been reached. Advantageously, the turn-off time point is therefore moved further into the future.

In an advantageous embodiment, a start-up enabling time point for the combustion engine is determined on the basis of the state of charge of the energy accumulator, on the basis of a performance during a run-up of the combustion engine, and on the basis of a performance during an overrun of the combustion engine. A start-up process of the combustion engine is enabled at the start-up enabling time point. Advantageously, this ensures that, when the combustion engine has been turned off, the combustion engine is only started up again if it has been ensured that energy generated by starting the combustion engine can be reliably absorbed in the energy accumulator during a run-up and an overrun.

Further features, possibilities for application and advantages of the invention can be found in the following description of embodiments of the invention, which are shown in the figures of the drawing. All the features that are described or shown, taken in isolation or in any desired combination, form the subject matter of the invention, independently of the manner in which they are worded or shown in the description or in the drawings, respectively. For functionally equivalent variables and features, the same reference signs are used in all the figures, even in different embodiments. Embodiments of the invention given by way of example are explained in the following, with reference to the drawing, in which:

DETAILED DESCRIPTION

Figure 1:
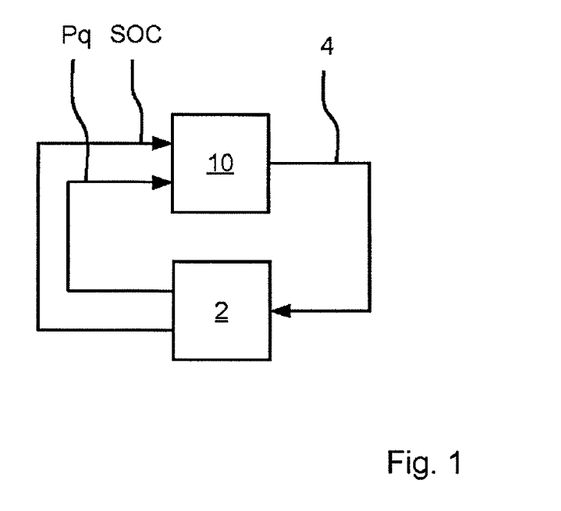
FIG. 1 is a schematic block diagram.

FIG. 1 is a schematic block diagram for the operation of a power generating device 2 comprising an combustion engine and an energy accumulator. A turn-off start time 4 for the combustion engine is determined by the block 10 on the basis of current power Pq of the combustion engine and on the basis of a state of charge SOC. The block 10 is, for example, part of a controller for the power generating device. A turn-off process of the combustion engine is started at the turn-off start time 4.

Figure 2:
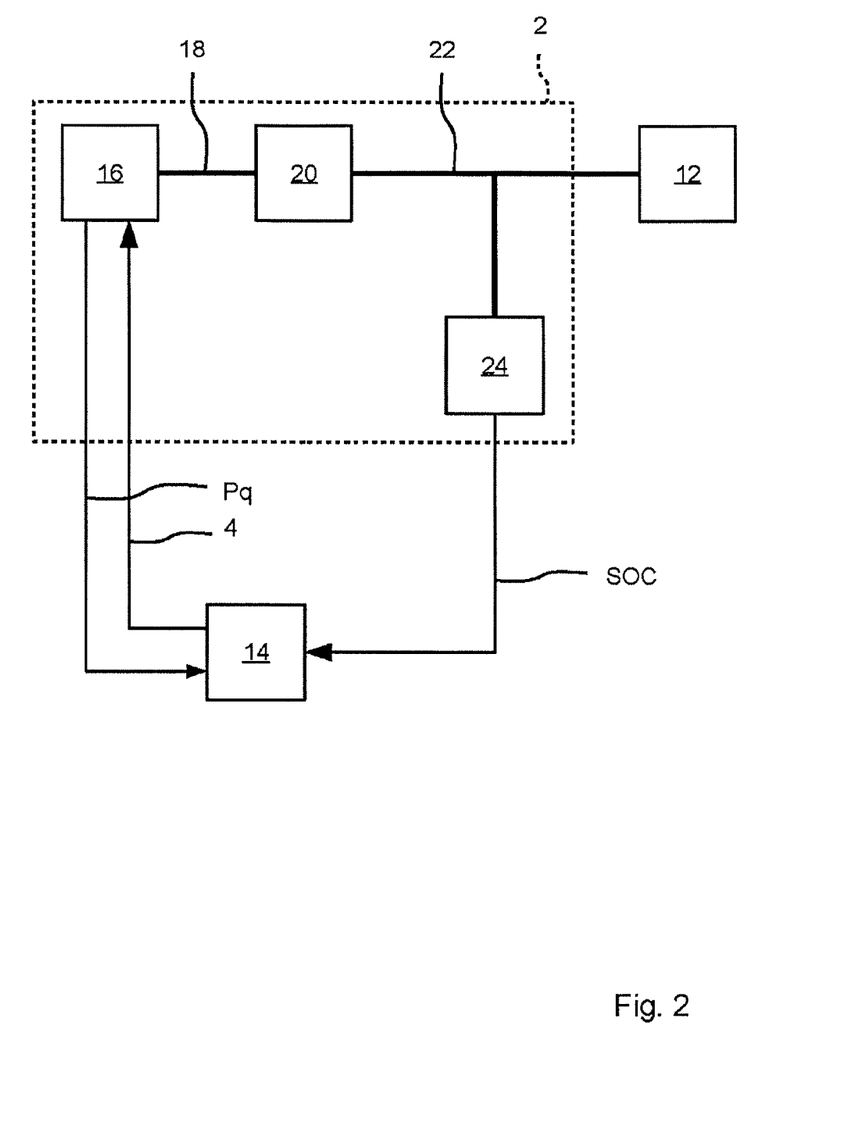
FIG. 2 is a schematic view of a power generating device, a load, and a controller.

FIG. 2 is a schematic view of the power generating device 2 and a load 12, which can also be referred to as an energy sink and is electrically coupled to the power generating device 2. A controller 14 for operating the power generating device 2 is also shown. The variables 4, Pq and SOC are supplied to the controller 14. Furthermore, other variables (not shown) can, of course, also be supplied to the controller 14. Of course, equivalent variables can also be used instead of the variables 4, Pq and SOC, or alternatively the variables 4, Pq and SOC are inherent to the correspondingly used variables. The power generating device 2 comprises an combustion engine 16 that is designed in particular as a gas motor or gas turbine. The combustion engine 16 is mechanically coupled to a generator 20 according to the mechanical connection 18, the generator 20 supplying electrical energy to an electrical connection 22 which can be designed, in particular, as a direct-current network. The electrical connection 22 interconnects the generator 20, the load 12, and an energy accumulator 24 within the meaning of an electrical coupling. The electrical connection 22 comprises cable connections, converters and similar devices in order to allow energy to be exchanged between the units 20, 12 and 24. The variables Pq and SOC relate to the electrical level according to the connection 22. Of course, the device 2 can comprise a plurality of drives, even of different kinds, which supply energy to the connection 22. Accordingly, a plurality of loads 12 can also be connected to the power generating device 2. A plurality of energy accumulators, even of different kinds, are also conceivable.

Figure 3:
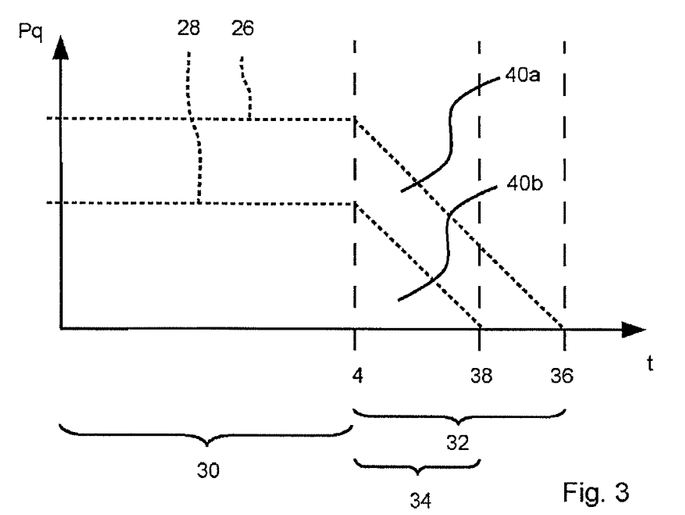
FIGS. 3 and 4 are each power/time diagrams.

FIG. 3 is a schematic power/time diagram. By way of example, two curves 26 and 28 of the actual power Pq of the combustion engine 16 are shown. The curve 26 has a higher value of actual power Pq than the curve 28 during normal operation 30. From the turn-off start time 4, a turn-off process 32 or 34 is started that ends at a time point 36 for the curve 26 and ends at a time point 38 for the curve 28. At the time points 36 and 38, the combustion engine 16 is substantially turned off and no longer outputs any power.

In particular, a gas motor should not be turned off immediately, and a step-like curve of the current power Pq arises, which is shown, in the present case, in an idealized manner in the regions of the turn-off process 32 and 34. At the turn-off time point 4, on the basis of the current power Pq turn-off processes 32 and 34 of different lengths arise that result in different amounts of generated energy. Shortly before or at the time point 4, on the basis of the current power Pq of the combustion engine 16 a corresponding estimated value 40 for the energy that is still anticipated is formed, which value can, in the present case, be determined for example as an integral below the curves 26 or 28 in the region of the turn-off processes 32 or 34, respectively. The turn-off processes 32 and 34 can each also be referred to as an overrun.

Figure 4:
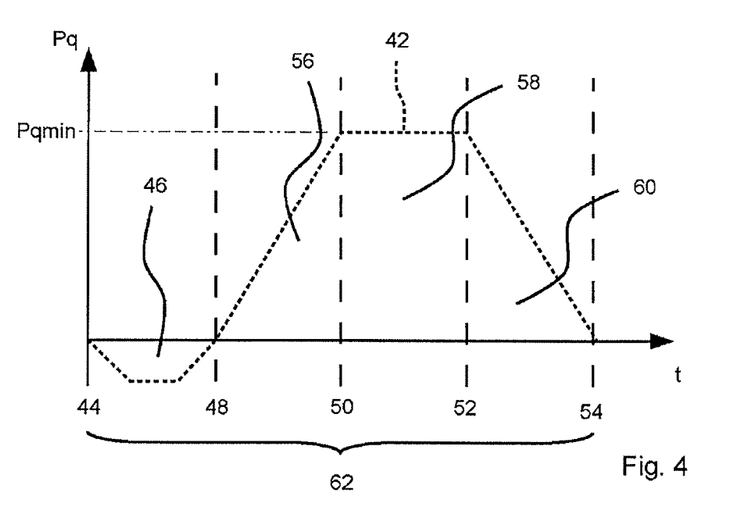

FIG. 4 is schematic view of a power/time diagram. A curve 42 of the current power Pq of the combustion engine 16 over time is shown. At a start-up enabling time point 44, the generator 20 receives energy from the energy accumulator 24 in order to start the combustion engine 16, as a result of which a negative curve 42 arises. An estimated value 46 for the reception of energy from the energy accumulator 24 is found from a negative integral.

From a time point 48, the combustion engine 16 outputs energy to the connection 22 and increases the energy output up to a minimum continuous power Pqmin at a time point 50.

From the time point 50, the curve 42 remains at the level of the minimum continuous power Pqmin up to a time point 52, in order to fall to a value of zero from the time point 52 up to the time point 54.

For a run-up of the combustion engine 16 from the time point 48 up to the time point 50, an estimated value 56 for the energy outputted by the combustion engine 16 in the time period between the time points 48 and 50 is determined.

An estimated value 58 is also determined that ascertains the energy output by the combustion engine 16 between the time points 50 and 52. A further estimated value 60 is determined in the same way as the estimated value 40

The composition of the curve 42 depends on the configuration and requirements of the combustion engine 16. For example, the curve 42 may also be composed only of the parts between the time point 48 and the time point 50 and between the time point 52 and the time point 54. Pqmin may also be dispensed with. The portions of the curve 42 between the time points 44 and 48 and the between the time points 50 and 52 are therefore optional and are intended to be provided depending on the configuration of the power generating device 2. In particular, the time point 48 may also be selected as the start-up enabling time point. Therefore, all estimated values between the time points 44 and 54 are totaled to an estimated value 62 that describes a minimum energy output of the combustion engine 16 during a start-up or turn-off of the combustion engine 16.

The start-up enabling time point 44 enables the starting or start-up for other functions that determine the starting of the combustion engine 16. This means that a start-up of the combustion engine 16 is allowed temporally after the start-up enabling time point 44, but need not necessarily occur. Temporally prior to the start-up enabling time point 44, a start-up of the combustion engine 16 is prevented.

Figure 5:
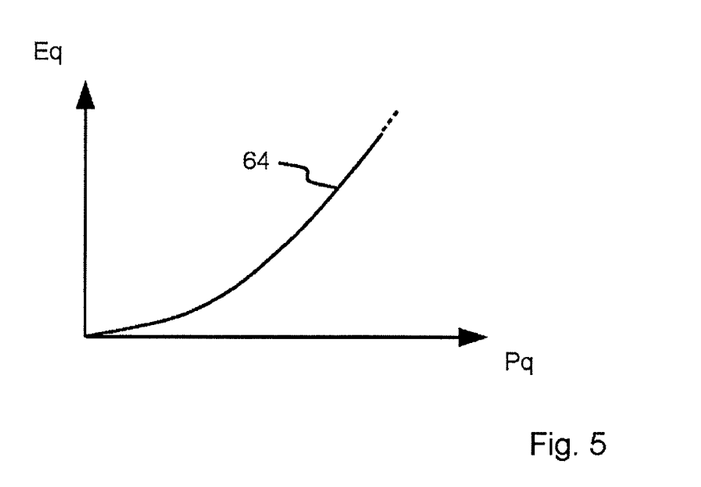
FIG. 5 is a schematic energy/power diagram.

FIG. 5 is schematic view of an energy/power diagram having a curve 64. The diagram or the curve 64 can be stored in the controller 14 as a characteristic map, in order to determine, on the basis of an current power Pq of the combustion engine 16, overrun energy Eq that would still be generated by the combustion engine 16 during an overrun or during a turn-off process and that the energy accumulator must be able to safely absorb. The curve 64 arises, by way of example, if it is assumed that there is a substantially triangular area under the curves 26 and 28 according to FIG. 3 in the regions 32 and 34.

In the same way, an energy/power diagram and a corresponding characteristic that is similar to the curve 64 can be determined for the estimated value 62 from FIG. 4.

Figure 6:
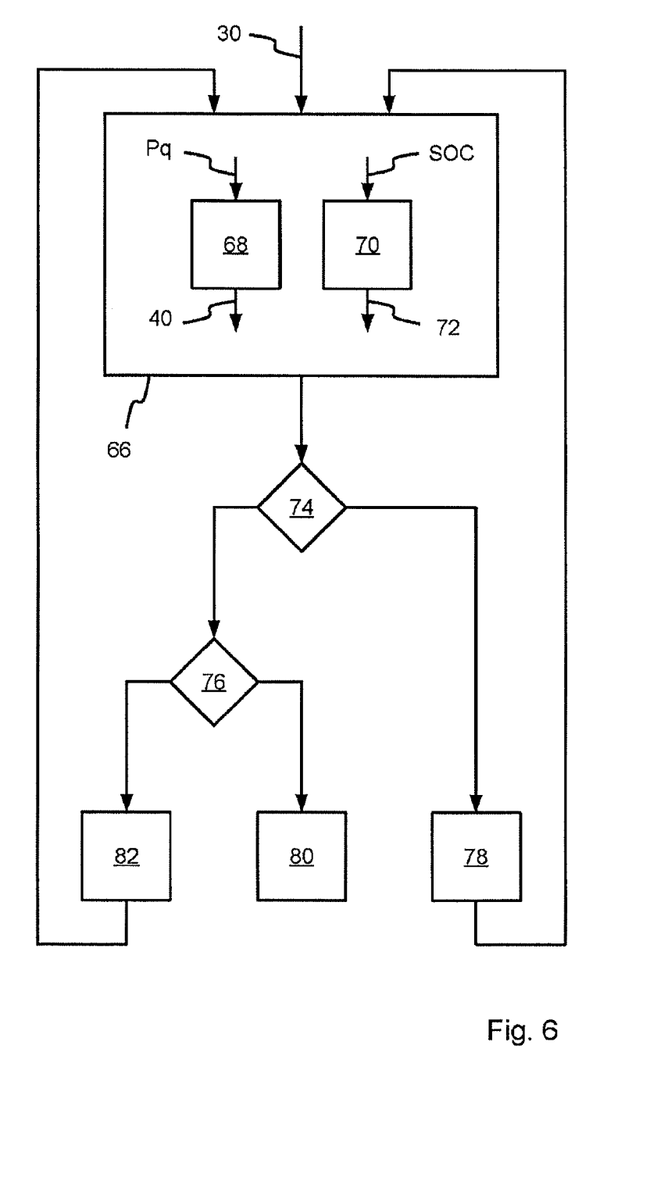
FIGS. 6, 6F, 7 and 7F are each schematic flow diagrams.
Figure 6F:
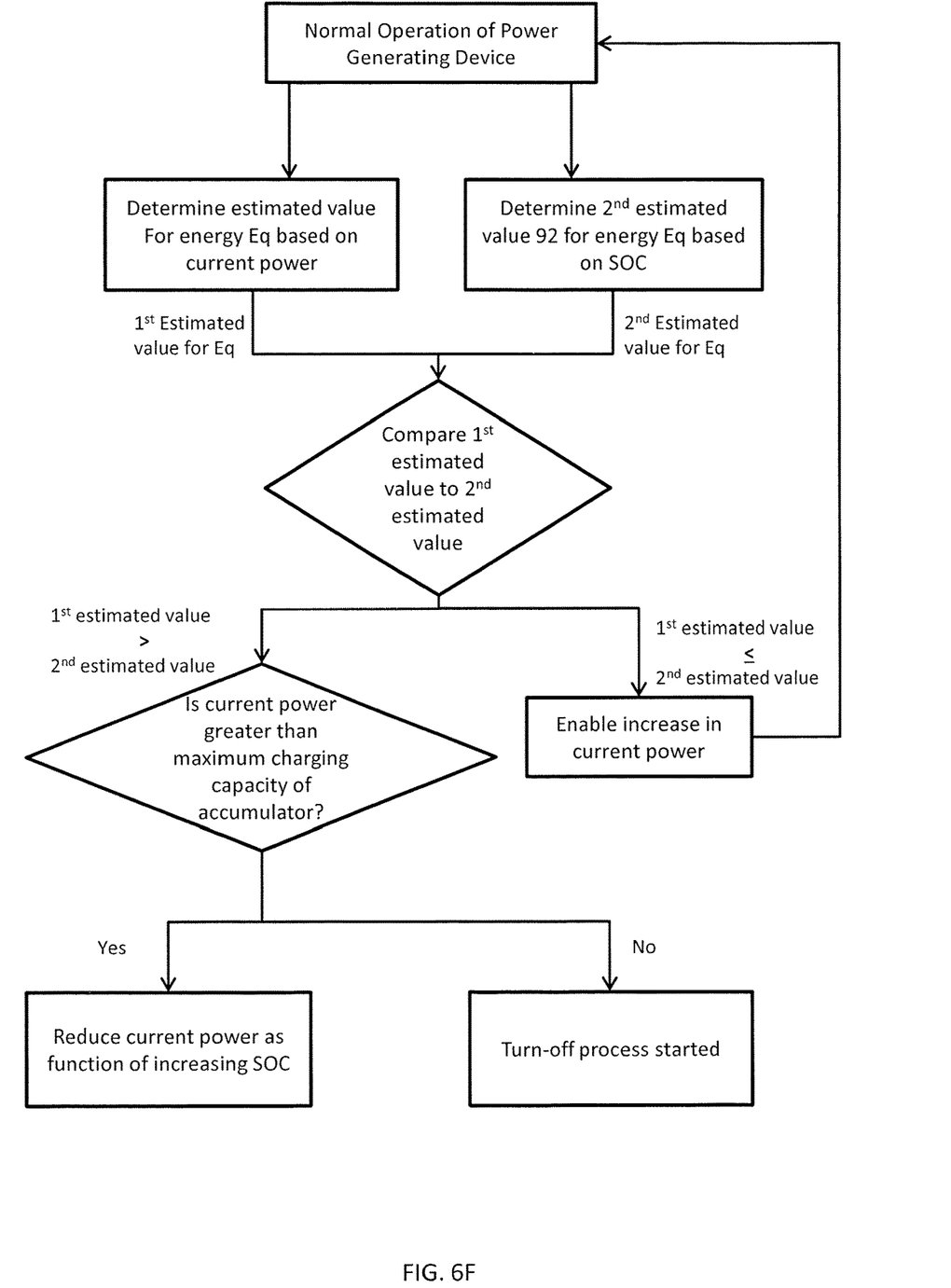

FIG. 6 is a schematic flow diagram. During normal operation 30 of the power generating device 2, a block 66 is carried out. Two blocks 68 and 70 are arranged in the block 66. The block 68 determines, from the current power Pq, the estimated value 40 for energy Eq that is generated by the combustion engine 16 during an overrun 32, 34. The estimated value 40 is also referred to as the first estimated value. The block 70 determines, on the basis of the state of charge SOC, a second estimated value 72 for energy that the energy accumulator 24 can reliably absorb during the overrun 32, 34. The energy received by the load 12 is indirectly observed by means of the second estimated value 72 being determined.

The second estimated value 72 can, of course, be linked to a fixed value; for example, the fixed value can be added to the second estimated value 72 in order to carry out an adjustment to the particular type of energy accumulator 24 and to thus improve operation of the energy accumulator 24 by means of a desired target state of charge. Specifying a fixed value in such a manner may be necessary for deliberately discharging the energy accumulator 24, in particular when taking the power generating device 2 out of operation in a planned manner.

At a branching point 74, the first estimated value 40 and the second estimated value 72 are compared with one another. If the first estimated 40 is greater than the second estimated value 72, a transition is made to the branching point 76. If the first estimated value 40 is no greater than the second estimated value 72, a transition is made to the block 78. The block 78 enables a further increase in the current power Pq.

In order to protect the energy accumulator 24, the aforesaid condition for transitioning to the branching point 76 can be AND-linked to the following condition: the current power Pq of the combustion engine 16 is greater than a maximum charging capacity of the energy accumulator 24. Of course, a direct transition to a state 80 can also be made.

Starting from the branching point 76, a transition is made to a block 80, and the turn-off process 32, 34 is started if the current power Pq of the combustion engine 16 is lower than the minimum continuous power Pqmin of the combustion engine 16. This prevents the combustion engine 16 from remaining in an operative state that is beyond the specification of the combustion engine 16. Of course, a transition can also be made from the branching point 74 directly to the state 80, the turn-off process 32, 34 being started if the first estimated value 40 is greater than the second estimated value 72.

If, at the branching point 76, the current power Pq of the combustion engine 16 is greater than the minimum continuous power Pqmin, the current power Pq of the combustion engine 16 is reduced in a block 82, in particular as a function of an increasing state of charge SOC of the energy accumulator 24.

Figure 7:
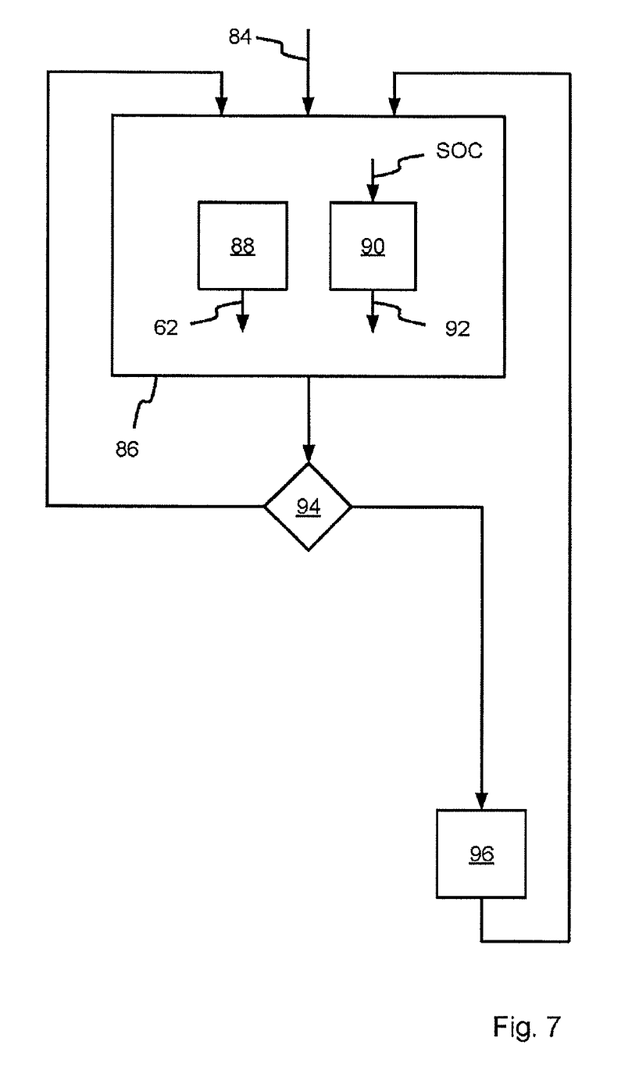
Figure 7F:
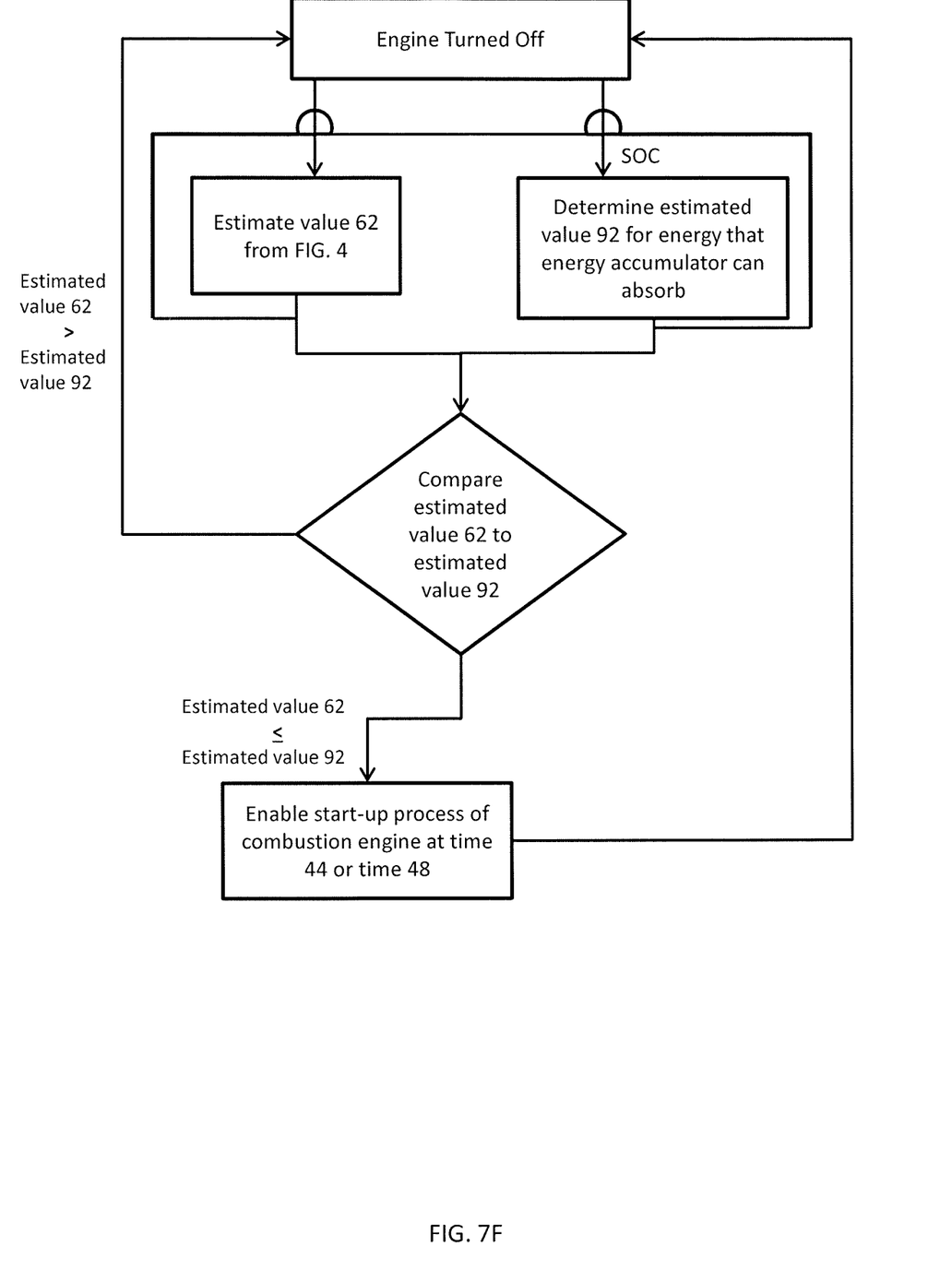

FIG. 7 is a schematic flow diagram. A transition is made from a state 84, in which the combustion engine 16 is turned off, to a block 86.

In a block 88, the estimated value 62 from FIG. 4 is generated. Of course, the estimated value 62 can also be stored as a fixed value. A block 90 determines, on the basis of the state of charge SOC of the energy accumulator 24, an estimated value 92 for the energy that the accumulator 24 can still reliably absorb at the present point in time.

At a branching point 94, the estimated values 62 and 92 are compared with one another. If the estimated value 62 is no greater than the second estimated value 92, a transition is made to the block 96, in which a start-up process of the combustion engine is then enabled at the start-up enabling time point 44 or 48. This ensures that a specification of the gas motor with regard to its performance when being started up and turned off can be readily adhered to, since the generated energy can be absorbed by the energy accumulator 24. Of course, the start-up time point can also occur later if this allows for a more advantageous operation of the power generating device 2.

The invention claimed is:

1. Method for operating a power generating device comprising a gas motor or a gas turbine and an energy accumulator, which are electrically coupled together, a current power (Pq) of the gas motor or a gas turbine being determined, comprising the steps of determining a first estimated value for energy (Eq) that would be generated by the gas motor or a gas turbine during a turn-off process on the basis of the current power (Pq), determining a second estimated value for energy that the energy accumulator can reliably absorb on the basis of a state of charge (SOC) of the energy accumulator, and in that current power (Pq) of the gas motor or gas turbine is reduced if the first estimated value is greater than the second estimated value.

2. Method according to claim 1, comprising the further step of enabling an increase in the current power (Pq) if the first estimated value is no greater than the second estimated value.

3. Method according to claim 1, comprising the further step of reducing the current power (Pq) of the gas motor or a gas turbine if the current power (Pq) is greater than a minimum continuous power (Pqmin) of the gas motor or a gas turbine.

4. Method according to claim 1, comprising the further step of reducing the current power (Pq) of the gas motor or a gas turbine if the current power (Pq) of the gas motor or a gas turbine is greater than the minimum continuous power (Pqmin) of the gas motor or a gas turbine and if a state of charge (SOC) of the energy accumulator increases.

5. Method according to claim 1, comprising the further step of reducing the current power (Pq) of the gas motor or a gas turbine engine if the current power (Pq) of the gas motor or a gas turbine engine is greater than a maximum charging capacity of the energy accumulator.

6. Method according to claim 1, comprising the further step of starting a turn-off process if the first estimated value is greater than the second estimated value.

7. Method according to claim 1, comprising the further step of starting the turn-off process if the current power (Pq) of the gas motor or a gas turbine is lower than a minimum continuous power (Pqmin) of the gas motor or a gas turbine.

8. Method according to claim 1, comprising the further step of determining a turn-off start time for the gas motor or a gas turbine on the basis of the current power (Pq) of the gas motor or a gas turbine and on the basis of a state of charge (SOC) of the energy accumulator, and starting a turn-off process of the gas motor or a gas turbine at the turn-off start time.

9. Method according to claim 1, comprising the further step of determining a start-up enabling time point for the gas motor or a gas turbine on the basis of the state of charge (SOC) of the energy accumulator, on the basis of a performance during a run-up of the gas motor or a gas turbine, and on the basis of a performance during an overrun of the gas motor or a gas turbine, and enabling a start-up process of the gas motor or a gas turbine at the start-up enabling time point.

10. A computer program product for a digital arithmetic unit for use in operating a power generating device comprising a gas motor or a gas turbine and an energy accumulator, which are electrically coupled to one another, the computer program product comprising a computer readable storage medium having program instructions embodied therewith, wherein the computer readable storage medium is not a transitory signal per se, the program instructions are readable by a computer to cause the computer to perform a method comprising: determining a first estimated value for energy (Eq) that would be generated by the gas motor or a gas turbine during a turn-off process on the basis of the current power (Pq), determining a second estimated value for energy that the energy accumulator can reliably absorb on the basis of a state of charge (SOC) of the energy accumulator, and in that current power (Pq) of the gas motor or gas turbine is reduced if the first estimated value is greater than the second estimated value.

11. Controller for operating a power generating device a gas motor or a gas turbine and an energy accumulator, which controller is provided with a digital arithmetic unit on which a computer program can run, the computer program comprising a computer readable storage medium having program instructions embodied therewith, wherein the computer readable storage medium is not a transitory signal per se, the program instructions are readable by a computer to cause the computer to perform a method comprising: determining a first estimated value for energy (Eq) that would be generated by the combustion engine during a turn-off process on the basis of the current power (Pq), determining a second estimated value for energy that the energy accumulator can reliably absorb on the basis of a state of charge (SOC) of the energy accumulator, and reducing current power (Pq) of the gas motor or gas turbine if the first estimated value is greater than the second estimated value.

12. Power generating device comprising a gas motor or a gas turbine and an energy accumulator, which are electrically coupled together, it being possible to determine a current power (Pq) of the gas motor or a gas turbine, the power generating device being adapted to determine a first estimated value for energy (Eq) that would be generated by the gas motor or a gas turbine during a turn-off process on the basis of the current power (Pq), determine a second estimated value for energy that the energy accumulator can reliably absorb on the basis of a state of charge (SOC) of the energy accumulator, and reducing current power (Pq) of the gas motor or gas turbine if the first estimated value is greater than the second estimated value.

13. Power generating device according to claim 12, wherein the power generating device comprises a computer program product comprising a computer readable storage medium having program instructions embodied therewith, wherein the computer readable storage medium is not a transitory signal per se, the program instructions are readable by a computer to cause the computer to perform a method comprising: determining a first estimated value for energy (Eq) that would be generated by the gas motor or a gas turbine during a turn-off process on the basis of the current power (Pq), determining a second estimated value for energy that the energy accumulator can reliably absorb on the basis of a state of charge (SOC) of the energy accumulator, and reducing current power (Pq) of the gas motor or gas turbine if the first estimated value is greater than the second estimated value.

* * * * *